C. M. PAXTON.
ANIMAL CATCHER.
APPLICATION FILED FEB. 2, 1916.
1,197,303.
Patented Sept. 5, 1916.
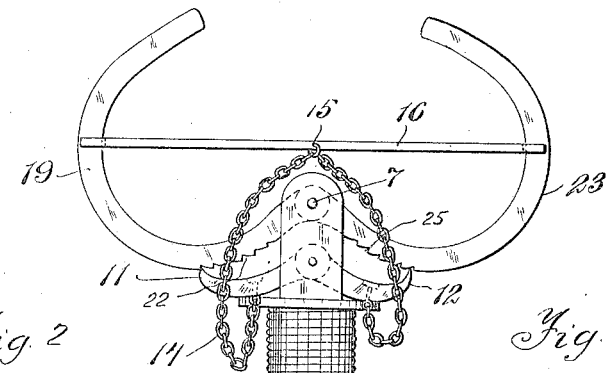
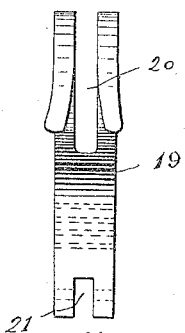
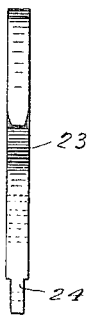
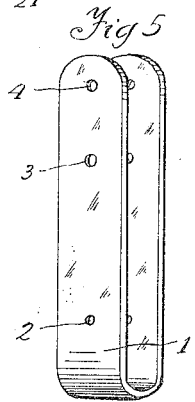
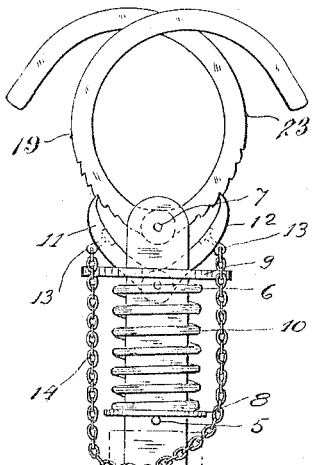

UNITED STATES PATENT OFFICE.

CHARLES M. PAXTON, OF HOUSTON, PENNSYLVANIA.

ANIMAL-CATCHER.

1,197,303.  Specification of Letters Patent.  Patented Sept. 5, 1916.

Application filed February 2, 1916. Serial No. 75,649.

*To all whom it may concern:*

Be it known that I, CHARLES M. PAXTON, a citizen of the United States, residing at Houston, in the county of Washington and State of Pennsylvania, have invented certain new and useful Improvements in Animal-Catchers, of which the following is a specification.

This invention relates to an animal catcher, particularly adapted for pigs and hogs, and has for its object to provide means, in a manner as hereinafter set forth, for quickly and conveniently catching an animal by grasping the limb thereof.

A further object of the invention is to provide an animal catcher having means, in a manner as hereinafter set forth, which is adapted to be pressed against the limb of the animal causing thereby the operation of the catcher and the quickly securing of the limb of the animal to the catcher.

A further object of the invention is to provide an animal catcher, having means in a manner as hereinafter set forth, for grabbing the limb of the animal whereby the latter is caught and further having locking elements associated with said means for maintaining the latter in locked position when secured to the limb of the animal.

Further objects of the invention are to provide an animal catcher which is simple in its construction and arrangement, conveniently set for the purpose of grasping the leg of the animal, efficient in its use, strong, readily assembled and inexpensive.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

In the drawings wherein like reference characters denote corresponding parts throughout the several views: Figure 1 is an elevation of an animal catcher in accordance with this invention showing the elements thereof set for the purpose of grasping the leg of the animal. Fig. 2 is an elevation of one of the catcher members. Fig. 3 is an elevation of the other of the catcher members. Fig. 4 is an elevation of an animal catcher in accordance with this invention showing the catcher members shifted to position when securing the limb of the animal to the catcher. Fig. 5 is a perspective view of the supporting yoke.

Referring to the drawings in detail 1 denotes a supporting yoke having each of the arms thereof provided with openings 2, 3, and 4. The openings of one arm are arranged in alinement with respect to the openings of the other arm and extending through the alining openings 2 is a pin 5. Mounted in the lining openings 3 is a pin 6 and in the alining openings 4 is a pin 7.

Surrounding the yoke 1 and bearing against the pin 5 is a disk or washer 8 and the latter has a square opening to prevent rotative movement of the disk with respect to the yoke 1. Positioned upon the yoke 1 and forward with respect to the disk 8 is a non-rotative washer 9, which is capable of sliding upon the yoke. The reference character 10 denotes a compression spring which surrounds the yoke 1 and is interposed between the washer 9 and disk 8.

Pivotally mounted within the yoke 1 and upon the pin 6 is a pair of oppositely disposed pawls 11, 12 which project from the yoke 1, as well as beyond the forward end thereof and secured to the pawls 11, 12 by eyelets 13, are the ends of the flexible member 14, which as illustrated consists of a chain and attached to the member 14, intermediate its ends, by the link 15, is a spacer member 16, shouldered near each end as at 17 and further pivoted near each end as at 18. The function of the spacer member 16 will be presently referred to.

The reference character 19 denotes a curved catcher member bifurcated as at 20, 21, and the rear end of said catcher member is pivotally mounted on the pin 7. The outer face of the member 19, near its rear end, is toothed as at 22, and capable of engaging with such teeth is the pawl 11.

The reference character 23 denotes a curved catcher member which is oppositely disposed with respect to the member 19 and which has a reduced rear end 24 and its outer face near its rear end toothed as at 25 and capable of engaging with such teeth is the pawl 12. The rear end of the catcher member 23 is mounted on the pin 7 and extends in the furcations 21. The outer portion of the catcher member 23 when the members are shifted to a position to grasp the limb of an animal extends through the furcations 20, as illustrated in Fig. 4. The pawls 11, 12 are not only employed for locking the catcher members in position when they surround the limb of the animal, but are also employed for shifting the catcher members 19, 23 from operative to inoperative position or to the position shown in Fig. 1 to that shown in Fig. 4. The pawls 11, 12 are actuated to shift the catcher members 19, 23 to the position shown in Fig. 4 by the washer 9 which is slid along the yoke 1 by the spring 10. The rear end of the yoke 1 is adapted to be detachably mounted in the handle 25 so that after the leg of the animal has been grasped the handle can be quickly removed. Adapted to be attached to the yoke 1, or any of the other elements of the device, is a rope, not shown, so that the animal can be pulled to the point desired.

The spacer member 16 is employed for maintaining the catcher members in spaced relation, as illustrated in Fig. 1, and when the spacer member 16 is mounted in such position the inner faces of the catcher members abut against the shoulder 17. This is clearly illustrated in Fig. 1 and owing to this manner of setting up the catcher members the spring 10 is pressed and the parts are then as illustrated in Fig. 1. Then if the catcher is forced against the limb of the animal, the spacer member 16 is shifted from the position shown in Fig. 1 and the expansion of the spring 10 will cause the catcher members to assume the position as in Fig. 4 and surround the limb of the animal under such conditions catching the same.

What I claim is:—

1. An animal catcher comprising a pair of oppositely disposed catcher members, means for spacing said members apart, and pivoted spring actuated elements engaging with said catcher members and shifting the same to operative position when said means is removed from the catcher members, said pivoted elements further locking said catcher members in operative position, and a flexible member for connecting said means with said pivoted elements.

2. An animal catcher comprising a pair of oppositely disposed catcher members, means for spacing said members apart, and pivoted spring actuated elements engaging with said catcher members and shifting the same to operative position when said means is removed from the catcher members, said pivoted elements further locking said catcher members in operative position, and a supporting yoke for said catcher members and said spring actuated pivoted elements, and a flexible member for connecting said means with said pivoted elements.

In testimony whereof I affix my signature in the presence of two witnesses.

CHARLES M. PAXTON.

Witnesses:
HOMER T. WILLISON,
VANCE D. PEACOCK.

Copies of this patent may be obtained for five cents each, by addressing the "Commissioner of Patents, Washington, D. C."